(12) United States Patent
Kim et al.

(10) Patent No.: US 8,492,049 B2
(45) Date of Patent: Jul. 23, 2013

(54) ANION EXCHANGE POLYMER ELECTROLYTES

(75) Inventors: Yu Seung Kim, Los Alamos, NM (US); Dae Sik Kim, Los Alamos, NM (US); Kwan-Soo Lee, Blacksburg, VA (US)

(73) Assignee: Los Alamos National Security, LLC, Los Alamos, NM (US)

(*) Notice: Subject to any disclaimer, the term of this patent is extended or adjusted under 35 U.S.C. 154(b) by 404 days.

(21) Appl. No.: 12/878,844

(22) Filed: Sep. 9, 2010

(65) Prior Publication Data
US 2011/0065018 A1 Mar. 17, 2011

Related U.S. Application Data

(60) Provisional application No. 61/242,247, filed on Sep. 14, 2009.

(51) Int. Cl.
*H01M 8/10* (2006.01)

(52) U.S. Cl.
USPC .............................. 429/483; 521/25; 528/125

(58) Field of Classification Search
USPC .............................. 429/483; 521/25; 528/125
See application file for complete search history.

(56) References Cited

U.S. PATENT DOCUMENTS

| | | | |
|---|---|---|---|
| 4,659,744 A | 4/1987 | Matsui et al. | |
| 4,923,611 A | 5/1990 | Hanada et al. | |
| 5,746,917 A | 5/1998 | Altmeier | |
| 5,998,057 A | 12/1999 | Koschany et al. | |
| 6,780,893 B2 | 8/2004 | Sugaya et al. | |
| 7,081,484 B2 | 7/2006 | Sugaya et al. | |
| 7,439,275 B2 | 10/2008 | Pivovar et al. | |
| 7,553,589 B2 | 6/2009 | Araki et al. | |
| 2004/0024123 A1* | 2/2004 | Moya | 525/72 |
| 2006/0217526 A1* | 9/2006 | Pivovar et al. | 528/373 |
| 2008/0124604 A1 | 5/2008 | Moussanoui et al. | |
| 2009/0208848 A1 | 8/2009 | Cho et al. | |
| 2009/0212253 A1 | 8/2009 | Kinouchi et al. | |
| 2009/0318575 A1 | 12/2009 | Pivovar et al. | |
| 2010/0183804 A1 | 7/2010 | Kim et al. | |

FOREIGN PATENT DOCUMENTS

WO    WO 03/098205    11/2003

OTHER PUBLICATIONS

Bauer et al, 'Anion-Exchange Membranes with Improved Alkaline Stability,' Desalination, 79, 124-144, 1990.
Sata et al., 'Permselectivity Between Two Anions in Anion Exchange Membranes Crosslinked with Various Diamines in Electrodialysis,' J. Polym. Sci. Polym. Chem. 34, 1475-1482, 1996.
Agel et al., 'Characterization and use of Anionic Membranes for Alkaline Fuel Cells,' J. Power Sources, 101, 267-274, 2001.
Pandey et al, 'Formation and Characterization of Highly Crosslinked Anion-Exchange Membranes,' J. Memb. Sci. 217, 117-130, 2003.
Varcoe et al, 'An Alkline Polymer Electrochemical Interface: A Breakthrough in Application of Alkaline Anion-Exchange Membranes in Fuel Cells,' Chem. Commun., 1428-1429, 2006.
Notification of Transmittal of the International Search Report and the Written Opinion of the International Searching Authority, or the Declaration issued on Nov. 4, 2010 for corresponding International Application No. PCT/US10/02486 filed on Sep. 14, 2010 (8 pages).

* cited by examiner

*Primary Examiner* — Shane Fang
(74) *Attorney, Agent, or Firm* — Juliet Ann Jones; Samuel L. Borkowsky

(57) ABSTRACT

Solid anion exchange polymer electrolytes and compositions comprising chemical compounds comprising a polymeric core, a spacer A, and a guanidine base, wherein said chemical compound is uniformly dispersed in a suitable solvent and has the structure:

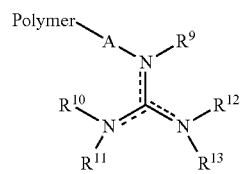

wherein:
i) A is a spacer having the structure O, S, $SO_2$, —NH—, —N(CH$_2$)$_n$—, wherein n=1-10, —(CH$_2$)$_n$—CH$_3$—, wherein n=1-10, $SO_2$-Ph, CO-Ph,

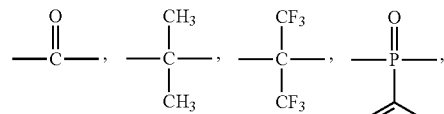

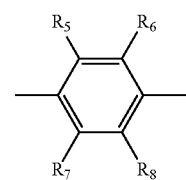

wherein $R_5$, $R_6$, $R_7$ and $R_8$ each are independently —H, —NH$_2$, F, Cl, Br, CN, or a $C_1$-$C_6$ alkyl group, or any combination of thereof;

ii) $R_9$, $R_{10}$, $R_{11}$, $R_{12}$, or $R_{13}$ each independently are —H, —CH$_3$, —NH$_2$, —NO, —CH$_n$CH$_3$ where n=1-6, HC=O—, NH$_2$C=O—, —CH$_n$COOH where n=1-6, —(CH$_2$)$_n$—C(NH$_2$)—COOH where n=1-6, —CH—(COOH)—CH$_2$—COOH, —CH$_2$—CH(O—CH$_2$CH$_3$)$_2$, —(C=S)—NH$_2$, —(C=NH)—N—(CH$_2$)$_n$CH$_3$, where n=0-6, —NH—(C=S)—SH, —CH$_2$—(C=O)—O—C(CH$_3$)$_3$, —O—(CH$_2$)$_n$—CH—(NH$_2$)—COOH, where n=1-6, —(CH$_2$)$_n$—CH=CH wherein n=1-6, —(CH$_2$)$_n$—CH—CN wherein n=1-6, an aromatic group such as a phenyl, benzyl, phenoxy, methylbenzyl, nitrogen-substituted benzyl or phenyl groups, a halide, or halide-substituted methyl groups; and iii) wherein the composition is suitable for use in a membrane electrode assembly.

8 Claims, No Drawings

ANION EXCHANGE POLYMER ELECTROLYTES

REFERENCE TO PRIOR APPLICATION

This application claims the benefit of priority of U.S. Patent Application 61/242,247, filed Sep. 14, 2009, incorporated herein in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to anion exchange polymer electrolytes comprising a guanidine base, and to liquid compositions and membranes for fuel cells comprising same.

BACKGROUND OF THE INVENTION

Ion exchange polymer electrolytes and their dispersion in liquid medium are an essential part of fuel cells and other electrochemical applications. In fuel cells, electrochemical reactions occur either in acidic or alkaline media. In acidic environments, proton exchange membranes offer the required combination of adequate longevity and good conductivity at relatively low temperatures (25-100° C.). Whereas fuel cells and electrolytes employ proton exchange membranes, alkaline fuel cells require anion-conducting polymer electrolytes. In alkaline environments, the efficiency of the oxygen reduction reaction is much higher than in acidic conditions, which allows the use of low-cost, abundant electro-catalysts as opposed to precious metal catalysts.

Traditionally, alkaline fuel cells use an aqueous solution of potassium hydroxide as the electrolyte, with typical concentrations of about 30%. A major operating constraint is the requirement for low carbon dioxide concentrations in the oxidant feed stream, as carbon dioxide can result in the formation of carbonate precipitates. One approach for addressing this issue is the use of solid anion conducting membranes. Alkaline fuel cell systems based on such membranes utilize the desirable properties of the solid electrolytes, such as the lack of requirement of liquid electrolyte circulation, less corrosion, and the capability of applying differential pressure and system design simplification.

A significant challenge in the area of alkaline fuel cells is the current lack of anion exchange polymer electrolytes that have i) good electrolyte stability in alkaline media, ii) high anionic conductivity, and iii) good processability.

Without wishing to be limited by theory, the low stability of anion exchange polymer electrolytes is due to fast hydrolysis of polymer electrolytes in highly basic conditions. The degradation process can be accelerated by electron-withdrawing molecules in the vicinity of cation functional group. Lower ionic conductivity of anion exchange polymer electrolytes, as compared to cation exchange polymer electrolytes, is due to the diffusion coefficient of the hydroxide ion, which is lower than that of protons, and the larger size of cation group in the anion exchange polymer electrolytes, which dilutes the concentration of exchange site. The low processability of alkyl ammonium cation-based anion exchange polymer electrolytes is due to their low solubility. Alkyl ammonium cation-based (and other cation-based) anion exchange polymer electrolytes may be synthesized by chloride substitution of a —CH$_2$Cl moiety of the polymers. Because the cation form of the polymer electrolytes is directly synthesized via chloride substitution, the resultant cation functionalized polymer electrolytes has limited solubility. The limited solubility has been a significant inhibitor of successful application of alkaline fuel cells.

The prior art teaches that stability of anion exchange polymer electrolytes can be improved by introducing highly basic and bulky cations such as sulfonium, phosphazenium, phosphazene and guanidinium. However, the cation functionality is directly attached to the hydrocarbon-based polymer backbone, which is technically challenging to synthesize. In addition, the stability of fluorinated polymer electrolytes comprising the directly-attached highly basic cations is questionable since electron withdrawing characteristics of fluorine tend to weaken the stability of the bulk cations. However, fluorination of polymer electrolytes is desirable, as it is understood to contribute to high gas permeability.

There exists a need, therefore, for anion conducting polymer electrolytes that are more stable to chemical degradation at high pH than currently available anion exchange polymer electrolytes, that have improved anionic conductivity, and that have better solubility in a dispersing medium, which in turn improves processability. Additionally, a need exists for methods of fabrication of high performance solid anion exchange membrane fuel cells which comprise the aforementioned anion conducting polymer electrolytes.

SUMMARY OF THE INVENTION

The present invention meets the aforementioned needs by providing anion exchange polymer electrolytes comprising a guanidine base, and a cation-stabilizing spacer moiety between the base and the polymer. This allows for desirable fluorination of the polymer, while counteracting the destabilizing electron-withdrawing capability of the fluorine atoms.

The following describe some nonlimiting embodiments of the present invention.

According to one embodiment of the present invention, a solid anion exchange polymer electrolyte is provided, comprising a polymeric core having the structure:

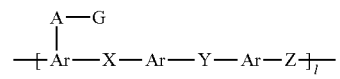

i.) wherein

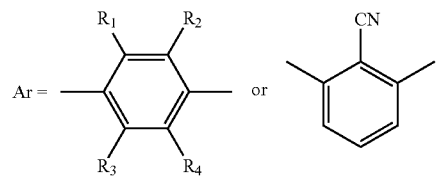

and R$_1$, R$_2$, R$_3$ and R$_4$ each are independently H, F or a C$_1$-C$_6$ alkyl group;

ii) X, Y, Z are independently a direct bond, O, S, SO$_2$,

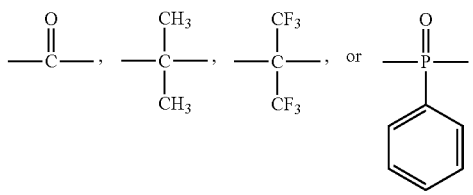

iii) A is a spacer having the structure O, S, SO$_2$, —NH—, —N(CH$_2$)$_n$, wherein n=1-10, —(CH$_2$)$_n$CH$_3$—, wherein n=1-10, SO$_2$-Ph, CO-Ph,

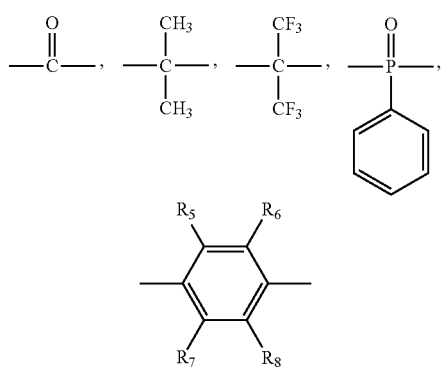

wherein R$_5$, R$_6$, R$_7$ and R$_8$ each are independently —H, —NH$_2$, F, Cl, Br, CN, or a C$_1$-C$_6$ alkyl group, or any combination of thereof;
iv) G is a guanidine base having the structure:

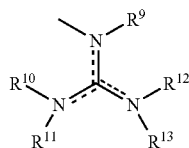

wherein at least one of R$_9$, R$_{10}$, R$_{11}$, R$_{12}$, or R$_{13}$ is hydrogen and wherein the non-hydrogen groups each independently are a non-cyclic heteroatomic group comprising nitrogen, oxygen, sulfur or a halide selected from the group consisting of fluoride, bromide, chloride and iodide.

According to another embodiment of the present invention, a solid anion exchange polymer electrolyte is provided, comprising a polymeric core having the structure:

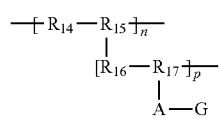

wherein
i) R$_{14}$, R$_{15}$=CF$_2$; or, R$_{14}$=CF$_2$ and R$_{15}$=CH$_2$; or R$_{14}$=CH$_2$, R$_{15}$=CHF; and
ii) R$_{16}$ is CH$_2$ or CF$_2$;
iii) R$_{17}$ is CH or CF;
iv) A is a spacer having the structure O, S, SO$_2$, —NH—, —N(CH$_2$)$_n$, wherein n=1-10, —(CH$_2$)$_n$CH$_3$—, wherein n=1-10, SO$_2$-Ph, CO-Ph,

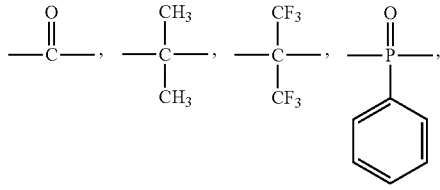

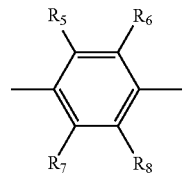

wherein R$_5$, R$_6$, R$_7$ and R$_8$ each are independently —H, —NH$_2$, F, Cl, Br, CN, or a C$_1$-C$_6$ alkyl group, or any combination of thereof;
v) G is a guanidine base having the structure:

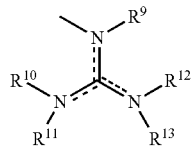

wherein R$_9$, R$_{10}$, R$_{11}$, R$_{12}$, or R$_{13}$ each independently are —H, —CH$_3$, —NH$_2$, —NO, —CH$_n$CH$_3$ where n=1-6, HC=O—, CH$_3$C=O—, NH$_2$C=O—, —CH$_n$COOH where n=1-6, —(CH$_2$)$_n$—C(NH$_2$)—COOH where n=1-6, —CH—(COOH)—CH$_2$—COOH, —CH$_2$—CH(O—CH$_2$CH$_3$)$_2$, —(C=S)—NH$_2$, —(C=NH)—N—(CH$_2$)$_n$CH$_3$, where n=0-6, —NH—(C=S)—SH, —CH$_2$—(C=O)—O—C(CH$_3$)$_3$, —O—(CH$_2$)$_n$—CH—(NH$_2$)—COOH, where n=1-6, —(CH$_2$)$_n$—CH=CH where n=1-6, —(CH$_2$)$_n$—CH—CN where n=1-6, an aromatic group such as a phenyl, benzyl, phenoxy, methylbenzyl, nitrogen-substituted benzyl or phenyl groups, a halide, or halide-substituted methyl group.

According to yet another embodiment of the present invention, a solid anion exchange polymer electrolyte is provided, comprising:

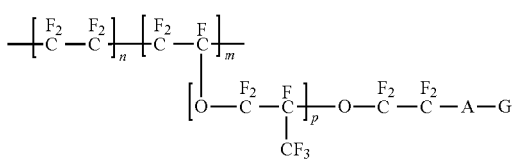

wherein
i) n and m are from 1-50 and p=1-10;
ii) A is a spacer having the structure O, S, SO$_2$, —N(CH$_2$)$_n$, wherein n=1-10, —(CH$_2$)$_n$CH$_3$—, wherein n=1-10, SO$_2$-Ph, CO-Ph,

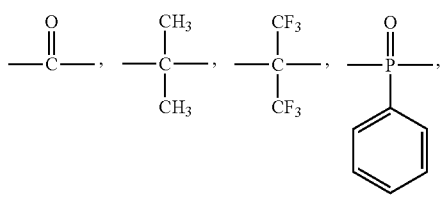

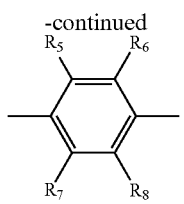

wherein $R_5$, $R_6$, $R_7$ and $R_8$ each are independently —H, —$NH_2$, F, Cl, Br, CN, or a $C_1$-$C_6$ alkyl group, or any combination of thereof;

iii) G is a guanidine base having the structure:

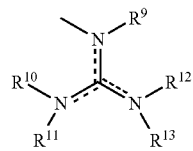

wherein $R_9$, $R_{10}$, $R_{11}$, $R_{12}$, or $R_{13}$ each independently are —H, —$CH_3$, —$NH_2$, —NO, —$CH_n CH_3$ where n=1-6, HC=O—, $CH_3C$=O—, $NH_2C$=O—, —$CH_n COOH$ where n=1-6, —$(CH_2)_n$—$C(NH_2)$—COOH where n=1-6, —CH—(COOH)—$CH_2$—COOH, —$CH_2$—CH(O—$CH_2CH_3$)$_2$, —(C=S)—$NH_2$, —(C=NH)—N—$(CH_2)_n CH_3$, where n=0-6, —NH—(C=S)—SH, —$CH_2$—(C=O)—O—C$(CH_3)_3$, —O—$(CH_2)_n$—CH—$(NH_2)$—COOH, where n=1-6, —$(CH_2)_n$—CH=CH wherein n=1-6, —$(CH_2)_n$—CH—CN wherein n=1-6, an aromatic group such as a phenyl, benzyl, phenoxy, methylbenzyl, nitrogen-substituted benzyl or phenyl groups, a halide, or halide-substituted methyl group.

According to yet another embodiment of the present invention, a composition comprising a chemical compound is provided, said chemical compound comprising a polymeric core, a spacer A, and a guanidine base, wherein said chemical compound is uniformly dispersed in a suitable solvent and has the structure:

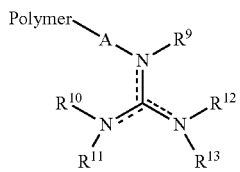

wherein:

i) A is a spacer having the structure O, S, $SO_2$, —NH—, —$N(CH_2)_n$, wherein n=1-10, —$(CH_2)_n CH_3$—, wherein n=1-10, $SO_2$-Ph, CO-Ph,

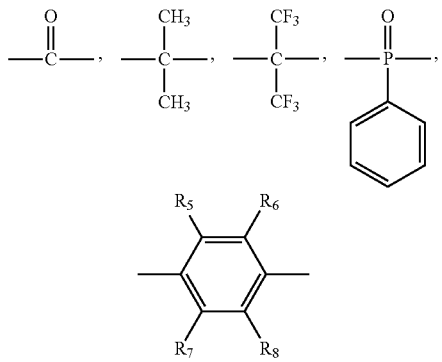

wherein $R_5$, $R_6$, $R_7$ and $R_8$ each are independently —H, —$NH_2$, F, Cl, Br, CN, or a $C_1$-$C_6$ alkyl group, or any combination of thereof;

ii) $R_9$, $R_{10}$, $R_{11}$, $R_{12}$, or $R_{13}$ each independently are —H, —$CH_3$, —$NH_2$, —NO, —$CH_n CH_3$ where n=1-6, HC=O—, —$CH_3C$=O—, $NH_2C$—O—, —$CH_n COOH$ where n=1-6, —$(CH_2)_n$—$C(NH_2)$—COOH where n=1-6, —CH—(COOH)—$CH_2$—COOH, —$CH_2$—CH(O—$CH_2CH_3$)$_2$, —(C=S)—$NH_2$, —(C=NH)—N—$(CH_2)$—$CH_3$, where n=0-6, —NH—(C=S)—SH, —$CH_2$—(C=O)—O—C$(CH_3)_3$, —O—$(CH_2)_n$—CH—$(NH_2)$—COOH, where n=1-6, —$(CH_2)_n$—CH=CH wherein n=1-6, —$(CH_2)_n$—CH—CN wherein n≦1-6, an aromatic group such as a phenyl, benzyl, phenoxy, methylbenzyl, nitrogen-substituted benzyl or phenyl groups, a halide, or halide-substituted methyl groups; and iii) wherein the composition is suitable for use in a membrane electrode assembly.

DETAILED DESCRIPTION OF THE INVENTION

The present invention relates to solid anion exchange polymer electrolytes, their dispersion in liquid media, and to membranes and membrane electrode assemblies comprising the solid anion exchange polymer electrolytes, in which the solid anion exchange polymer electrolyte is a chemical compound comprising a polymeric core, a guanidine base, and a cation-stabilizing spacer therebetween, having the structure:

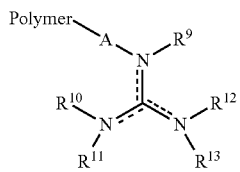

wherein A is a cation-stabilizing spacer positioned between the polymer main chain and the guanidine base, having the having the structure O, S, $SO_2$, —NH—, —$N(CH_2)_n$, wherein n=1-10, —$(CH_2)_n CH_3$—, wherein n=1-10, $SO_2$-Ph, CO-Ph,

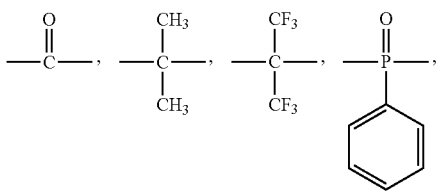

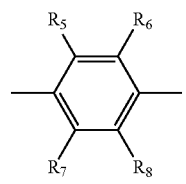

wherein $R_5$, $R_6$, $R_7$ and $R_8$ each are independently —H, —$NH_2$, F, Cl, Br, CN, or a $C_1$-$C_6$ alkyl group, or any combination of thereof;

$R_9$, $R_{10}$, $R_{11}$, $R_{12}$ and $R_{13}$ each independently may be —H, —$CH_3$, —$NH_2$, —NO, —$CH_n CH_3$ where n=1-6, HC=O—, $CH_3C$=O—, $NH_2C$=O—, —$CH_n COOH$ where n=1-6, —$(CH_2)_n$—$C(NH_2)$—COOH where n=1-6, —CH—(COOH)—$CH_2$—COOH, —$CH_2$—CH(O—$CH_2CH_3$)$_2$, —(C=S)—$NH_2$, —(C=NH)—N—$(CH_2)_n CH_3$, where n=0-6, —NH—(C=S)—SH, —$CH_2$—(C=O)—O—C$(CH_3)_3$, —O—$(CH_2)_n$—CH—$(NH_2)$—COOH, where n=1-6, —$(CH_2)_n$—CH=CH where n=1-6, —$(CH_2)_n$—CH—CN where n=1-6, an aromatic group such as a phenyl, benzyl, phenoxy, methylbenzyl, nitrogen-substituted benzyl or phenyl groups, a halide, halide-substituted methyl group and/or any of the following structures:

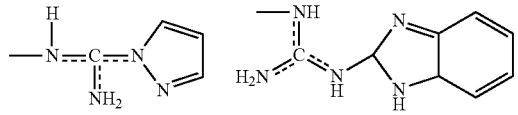

In an alternative embodiment, at least one of $R_9$, $R_{10}$, $R_{11}$, $R_{12}$ and $R_{13}$ is hydrogen, and the non-hydrogen groups each independently may be a non-cyclic heteroatomic group comprising nitrogen, oxygen, sulfur or a halide (X), wherein X is selected from the group consisting of fluoride, bromide, chloride or iodide. In one embodiment, $R_9$, $R_{10}$, $R_{11}$, $R_{12}$ and $R_{13}$ all are hydrogen. Hydrogenated guanidine has the advantage of superior stability in anion exchange polymer electrolytes. In an alternative embodiment, $R_9$, $R_{10}$, $R_{11}$, $R_{12}$, and $R_{13}$ all are —$CH_3$.

According to one embodiment of the present invention, the solid anion exchange polymer electrolytes comprise a polymeric core having the following structure:

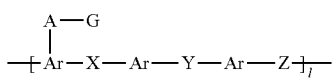

i) wherein

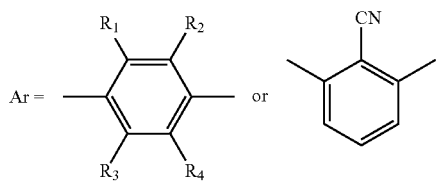

and $R_1$, $R_2$, $R_3$ and $R_4$ each are independently H, F or a $C_1$-$C_6$ alkyl group;

ii) X, Y, 2 are independently a direct bond, O, S, $SO_2$,

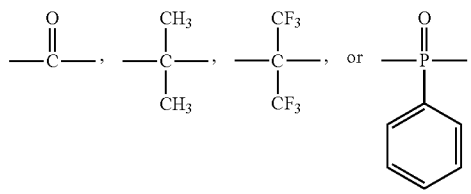

iii) A is a spacer having the structure O, S, $SO_2$, —NH—, —N($CH_2$)$_n$, wherein n=1-10, —($CH_2$)$_n$$CH_3$—, wherein n=1-10, $SO_2$-Ph, CO-Ph,

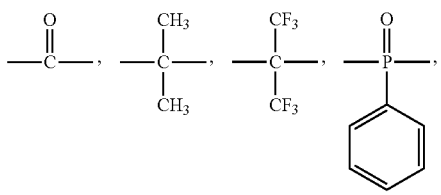

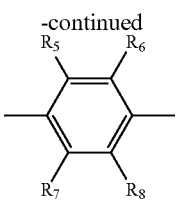

wherein $R_5$, $R_6$, $R_7$ and $R_8$ each are independently —H, —$NH_2$, F, Cl, Br, CN, or a $C_1$-$C_6$ alkyl group, or any combination of thereof;

iv) G is a guanidine base having the structure:

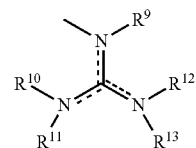

wherein at least one of $R_9$, $R_{10}$, $R_{11}$, $R_{12}$, or $R_{13}$ is hydrogen and wherein the non-hydrogen groups each independently are a non-cyclic heteroatomic group comprising nitrogen, oxygen, sulfur or a halide selected from the group consisting of fluoride, bromide, chloride and iodide. In one embodiment, $R_9$, $R_{10}$, $R_{11}$, $R_{12}$, or $R_{13}$ all are hydrogen.

In one embodiment, $R_1$, $R_2$, $R_3$ and $R_4$ are fluorine. In one embodiment, X, Y and Z are $SO_2$. In one embodiment, A is CO-Ph, where Ph is a phenyl moiety, and $R_5$, $R_6$, $R_7$ and $R_8$ are hydrogen.

According to another embodiment of the present invention, a solid anion exchange polymer electrolyte is provided, comprising a polymeric core having the structure:

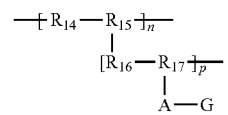

wherein
i) $R_{14}$, $R_{15}$=$CF_2$; or, $R_{14}$=$CF_2$ and $R_{15}$=$CH_2$; or $R_{14}$=$CH_2$, $R_{15}$=$CHF$; and
$R_{16}$ is $CH_2$ or $CF_2$;
iii) $R_{17}$ is CH or CF;
iv) A is a spacer having the structure O, S, $SO_2$, —NH—, —N($CH_2$)$_n$, wherein n=1-10, —($CH_2$)$_n$$CH_3$—, wherein n=1-10, $SO_2$-Ph, CO-Ph,

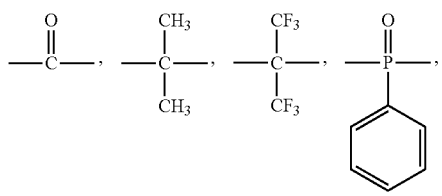

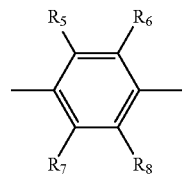

wherein $R_5$, $R_6$, $R_7$ and $R_8$ each are independently —H, —$NH_2$, F, Cl, Br, CN, or a $C_1$-$C_6$ alkyl group, or any combination of thereof;

v) G is a guanidine base having the structure:

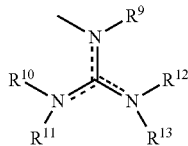

wherein $R_9$, $R_{10}$, $R_{11}$, $R_{12}$, or $R_{13}$ each independently are —H, —$CH_3$, —$NH_2$, —NO, —$CH_nCH_3$ where n=1-6, HC=O—, $CH_3$C=O—, $NH_2$C=O—, —$CH_n$COOH where n=1-6, —$(CH_2)_n$—$C(NH_2)$—COOH where n=1-6, —CH—(COOH)—$CH_2$—COOH, —$CH_2$—CH(O—$CH_2CH_3)_2$, —(C=S)—$NH_2$, —(C=NH)—N—$(CH_2)_nCH_3$, where n=0-6, —NH—(C=S)—SH, —$CH_2$—(C=O)—O—C$(C_{1-3})_3$, —O—$(CH_2)_n$—CH—$(NH_2)$—COOH, where n=1-6, —$(C_{1-2})_n$—CH=CH where n=1-6, —$(CH_2)_n$—CH—CN where n=1-6, an aromatic group such as a phenyl, benzyl, phenoxy, methylbenzyl, nitrogen-substituted benzyl or phenyl groups, a halide, or halide-substituted methyl group.

In one embodiment, $R_9$, $R_{10}$, $R_{11}$, $R_{12}$, and $R_{13}$ all are —$CH_3$. Alternatively, $R_9$, $R_{10}$, $R_{11}$, $R_{12}$, and $R_{13}$ all are —H. In one embodiment, $R_{14}$, $R_{15}$, and $R_{16}$ are all $CF_2$. In another embodiment, $R_5$, $R_6$, $R_7$ and $R_8$ are hydrogen.

According to yet another embodiment of the present invention, the solid anion exchange polymer electrolytes comprise a polymeric core having the following structure:

a) a polymeric core having the structure:

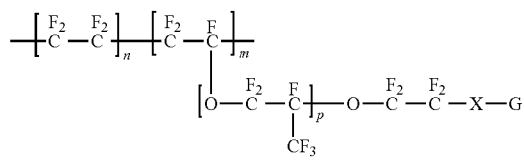

i) n and m are from 1-50 and p=1-10;

ii) A is a spacer having the structure O, S, $SO_2$, —NH—, —N$(CH_2)_n$, wherein n=1-10, —$(CH_2)_nCH_3$—, wherein n=1-10, $SO_2$-Ph, CO-Ph,

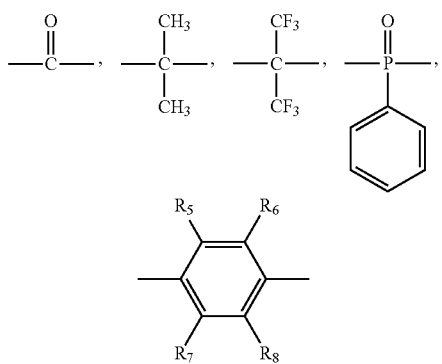

wherein $R_5$, $R_6$, $R_7$ and $R_8$ each are independently —H, —$NH_2$, F, Cl, Br, CN, or a $C_1$-$C_6$ alkyl group, or any combination of thereof;

iii) G is a guanidine base having the structure:

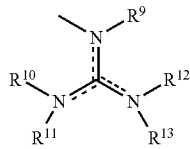

wherein $R_9$, $R_{10}$, $R_{11}$, $R_{12}$, or $R_{13}$ each independently are —H, —$CH_3$, —$NH_2$, —NO, —$CH_nCH_3$ where n=1-6, HC=O—, $CH_3$C=O—, $NH_2$C=O—, —$CH_n$COOH where n=1-6, —$(CH_2)_n$—$C(NH_2)$—COOH where n=1-6, —CH—(COOH)—$CH_2$—COOH, —$CH_2$—CH(O—$CH_2CH_3)_2$, —(C=S)—$NH_2$, —(C=NH)—N—$(CH_2)_nCH_3$, where n=0-6, —NH—(C=S)—SH, —$CH_2$—(C=O)—O—C$(CH_3)_3$, —O—$(CH_2)_n$—CH—$(NH_2)$—COOH, where n=1-6, —$(CH_2)_n$—CH=CH wherein n=1-6, —$(CH_2)_n$—CH—CN wherein n=1-6, an aromatic group such as a phenyl, benzyl, phenoxy, methylbenzyl, nitrogen-substituted benzyl or phenyl groups, a halide, or halide-substituted methyl group.

In one embodiment, $R_9$, $R_{10}$, $R_{11}$, $R_{12}$ and $R_{13}$ all are hydrogen. In an alternative embodiment, $R_9$, $R_{10}$, $R_{11}$, $R_{12}$, and $R_{13}$ all are —$CH_3$. In one embodiment, A is CO-Ph, where Ph is a phenyl moiety. In another embodiment, $R_5$, $R_6$, $R_7$ and $R_8$ are hydrogen.

The anion exchange polymer electrolytes comprising a guanidine base of the present invention are extremely stable, highly conductive, highly gas permeable and have good processiblity compared to state of the art anion exchange polymer electrolytes comprising alkyl ammonium bases.

Without wishing to be limited by theory, the degradation of anion exchange polymer electrolytes occurs via elimination reaction (E2) or nucleophilic substitution ($S_N2$) reaction. E2 reactions can occur in cationic functional groups having β-hydrogens with a dihedral angle of 0 or 180°. The anion exchange polymer electrolytes comprising a guanidine base of the present invention do not have a β-hydrogen or a dihedral angle of 0 or 180°, which may greatly reduce the potential of E2 degradation. The rate of $S_N2$ reaction depends strongly on the basicity of the leaving group. In general, the weaker the basicity of the group (the higher the pKa), the greater its leaving ability. The pKa value of the guanidine base is approximately five orders of magnitude higher than trialkyl amine, which suggests a much higher stability. Another factor that affects the $S_N2$ reaction rate is the electron density of the cationic functional group. In the case of 1,4-diazabicyclooctane (DABCO), the pKa value is lower than that of alkyl ammonium, however, the non-ionized nitrogen can donate its unpaired electrons to the ionized nitrogen, thus stabilizing the cationic group. Guanidine bases also have high electron density and resonance structures, which greatly stabilize the functional group. The stability of the guanidine base can further be improved by introducing electron-donating (cation-stabilizing) spacer groups. Introducing electron-donating spacer groups allows utilizing, fluorinated polymer systems which have high gas permeability. The anionic conductivity of the anion exchange polymer electrolytes of the present invention is excellent. The molecular volume of the guanidine base is relatively small compared with other highly basic functionalities such as diaza(1,3)bicyclo[5.4.0]undecane (DBU), Verkade bases and Schwesinger phosphazene bases. The relatively small volume of the guanidine base decreases among cationic functional groups, which improves anionic conductivity. The higher conductivity as compared to alkyl ammonium based anion exchange polymer electrolytes is likely due to its resonance structure, wherein the cation in the guanidine base is delocalized, which provides three ion exchange sites. The resonance structures provide not only stability but also good conductivity in that three nitrogen atoms participate in anionic conduction, whereas traditional alkyl ammonium bases have only a single nitrogen.

The anion exchange polymer electrolytes of the present invention also have excellent processibility. Unlike anion exchange polymer electrolytes, guanidine base anion exchange polymer electrolytes can be synthesized via a neutral form and subsequently ionized. The neutral form (I) in Scheme 1 of the guanidine base functionalized polymer electrolytes have relatively good solubility (or dispersibility) in aprotic solvents such as dimethylsulfoxide, dimethylformamide, and n-methyl m-pyrrolidone, and protic solvents such as glycerol, at elevated temperatures. Even the ionized form (II) and (III) are soluble (or dispersible) in a few aprotic solvents. The ability to disperse the polymer electrolyte in a liquid medium results in versatility and processibility. The good dispersion qualities of the anion exchange polymer electrolytes of the present invention allows the use of state of the art processing methods of proton exchange membrane fuel cells, which are far advanced compared to those of alkaline anion exchange membrane fuel cells.

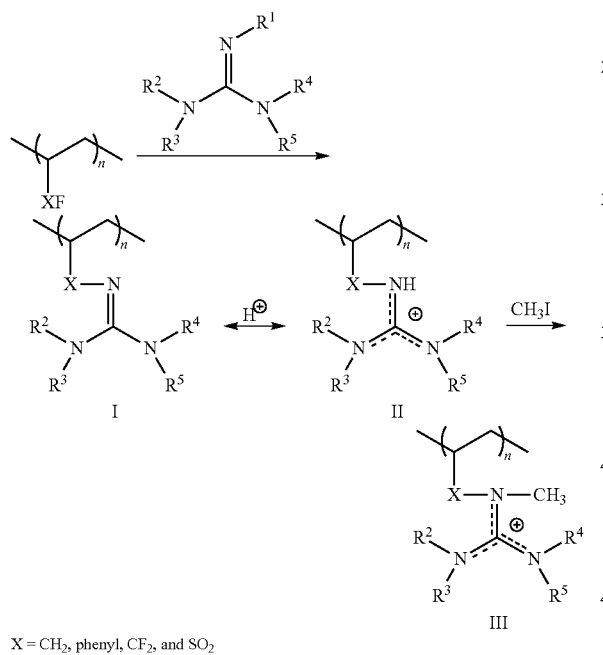

X = $CH_2$, phenyl, $CF_2$, and $SO_2$

The present invention is related to polymers, anion conducting membranes, and polymer dispersions in liquid mediums. The functionalized anion exchange polymer electrolytes of the present invention can be synthesized from wholly perfluorinated, partially perfluorinated, and polyaromatic polymers. Alternatively, synthesis may be performed by first functionalizing the monomers, followed by direct polymerization. Polymer modification has the advantages of being simpler and more economical whereas direct polymerization of the monomer has the advantage of allowing more precise control over the polymer architecture. Hereinafter, we provide one non-limiting example of the synthetic procedure and preparation methods to obtain the materials from polymer modification and direct polymerization from monomers that this invention claims.

Synthesis Using Methyl Brominated Polymers

The anion exchange polymer electrolytes of the present invention may be synthesized by the reaction of methyl brominated polymers with a guanidine base (Scheme 2).

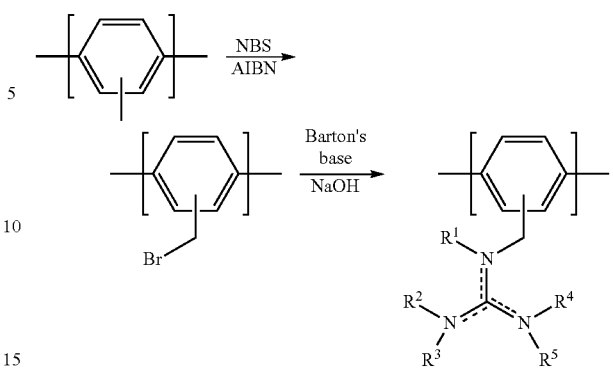

Synthesis Using Sulfonyl Halide Polymer Precursor

The anion exchange polymer electrolytes of the present invention may be synthesized using the precursor to the perfluorinated sulfonic acid or sulfonated hydrocarbon based polymers. Scheme 3 shows an example of a functionalized perfluorinated polymer comprising a guanidine base by using a known procedure such as a Grignard reaction. Here, the guanidine base is directly connected to a —$CH_2$ group. In contrast to Scheme 2, the absence of a β-hydrogen may improve polymer stability.

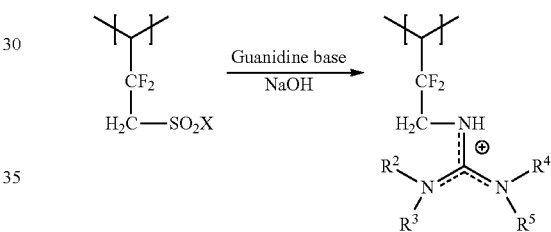

A more simple and economical method is via direct reaction of the sulfonyl fluoride polymer with guanidine base. Two examples of synthesizing guanidine base functionalized perfluorinated and hydrocarbon based polymer are depicted in Scheme 4:

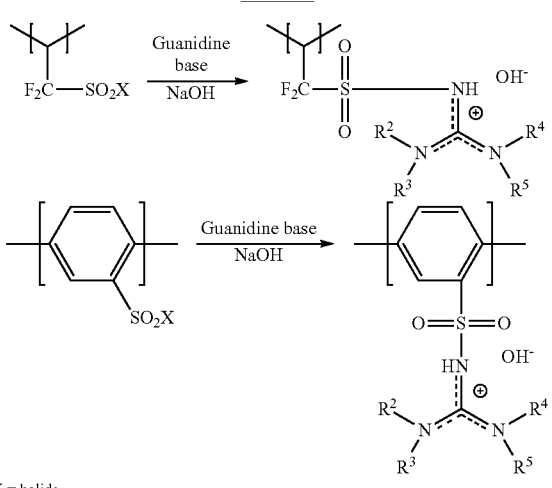

X = halide

Synthesis Using a Spacer

The anion exchange polymer electrolytes of the present invention may be synthesized using the precursor to the perfluorinated sulfonyl fluoride or carboxylic acid based polymers and a spacer. Scheme 5 shows an example of a functionalized perfluorinated polymer comprising a spacer and guanidine base. Here, the guanidine base is connected to a spacer having one of the aforementioned structures.

Scheme 5

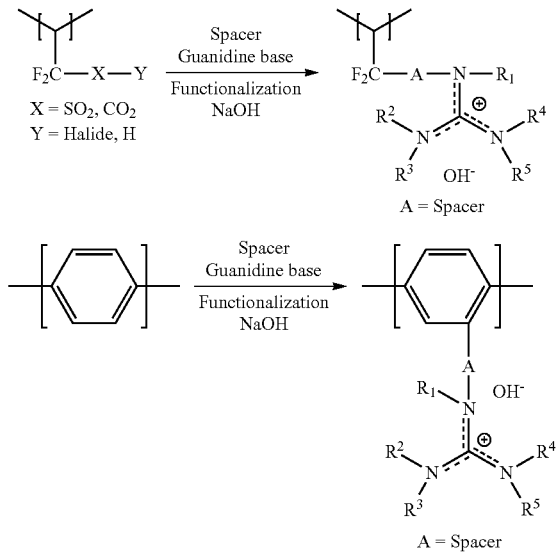

Synthesis Using Direct Polymerization

Functionalized polymer electrolytes also may be synthesized by the direct polymerization of functionalized monomer with a guanidine base (anion exchange unit) with a commercially available monomer, as shown in Scheme 6.

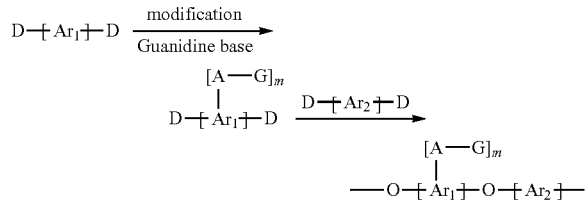

wherein

D=a halide such as F, Cl, Br, or I

G is a guanidine base having one of the aforementioned structures m=1-8 i) $Ar_1$ and $Ar_2$ include a monomer having the structure $Ar_1$, $Ar_2$:

Scheme 6

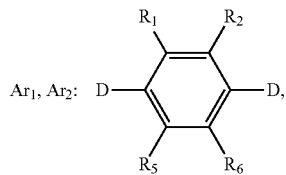

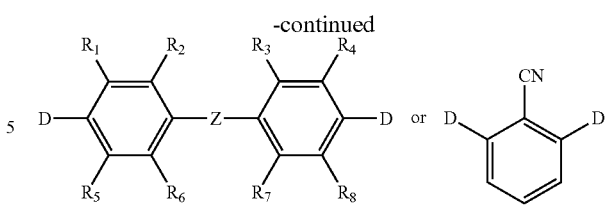

wherein

D is halide (such as F, Cl, Br, I), —OH, —SH, or —$NH_2$; Z is a direct bond or —$SO_2$—, —C(=O)—, or —P(=O)(aryl)-, or —$C(CX_3)_2$— where X is hydrogen or fluorine; wherein $R_5$ each independently may denote H, an alkyl, cycloalkyl, alkenyl, aryl, or aralkyl groups having 1 to 10 carbon atoms, or a heterocylclic group having 4 to 20 carbon atoms; and $R_1$-$R_8$ may together form a —$(CH_2)_2$—, —$(CH_2)_3$—, —$(CH_2)_4$—, —$(CH_2)_5$—, —CH=CH—, or —CH=CH—CH—CH—.

As for the polymer structure which forms the anion-exchange polymer electrolytes of the finally obtained, in addition to the aforementioned compounds, other suitable compounds which would be known to one of skill in the art may be used. Engineering plastic-based, radiation grafted and fluorocarbon polymers may produce superior mechanical properties in anion exchange membranes. Fluorocarbon polymers are preferred for electrode materials due to higher reactant permeability and inertness to catalysts. Fluorocarbon polymers using direct reaction of the sulfonyl fluoride polymer with the guanidine base is more economical. The number of anion exchange groups of the polymer electrolytes is not particularly limited, however, in one embodiment an ion exchange capacity (IEC) of from about 0.2 meq/g to about 5.0 meq/g, and alternatively is from about 0.5 meq/g to about 3.0 meq/g, is preferred for superior conductivity and mechanical properties.

Membrane Preparation

Guanidine base functionalized anion-exchange membranes can be prepared in a variety of methods that would be known to one of skill in the art, including solution casting, extrusion, blade method, spin coating, melt processing, etc. The thickness of the final polymer membrane of the present invention may be from about 5 pin to about 150 µm, and alternatively is from about 10 µn to 100 µm.

The guanidine base functionalized polymer electrolytes can be used as a filler in organic or inorganic substrates. When the guanidine base functionalized anion exchange polymer electrolytes are produced by impregnating a porous structure, the substrate may be any one of a variety of suitable substrates, such as woven fabric or unwoven fabric. Alternatively, a porous membrane may be used.

Dispersion Preparation

The neutral and ionized forms of guanidine base functionalized polymers may be readily dissolved or dispersed in protic or aprotic solvents or dispersion media. Some examples of suitable liquid media include water, ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, dimethylformamide (DMF), dimethylacetamide (DMAc), N-methylpyrrolidone (NMP), dimethylsulfoxide (DMSO), and combinations thereof. In one embodiment, the solvent is an aprotic solvent, which is advantageous because when a proton is donated in a protic solvent, this converts the neutral from to the ionized form, which is more difficult to dissolve or disperse in a liquid medium. In addition, hydrolysis may occurs in water-based protic solvents at high temperature processing (ca. >200° C.). In one embodiment, the aprotic solvent is selected from the group consisting of dimethylformamide, dimethylacetamide, N-methylpyrrolidone, dimethylsulfoxide, and combinations thereof. In another embodiment, the solvent is an alcohol. In one embodiment, the solvent is an alcohol selected from the group consisting of ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, and combinations thereof.

The concentration of the polymer electrolytes in the liquid medium is not particularly limited, and depends on a variety of factors that would be known to one of skill in the art, such as the type of solvent, the amounts used in the electrode catalyst, viscosity, permeability, etc. In one embodiment, the concentration of the polymer electrolytes is from about 0.1% to about 20%, and alternatively is from about 0.5% to 10%, wherein the % represents the weight of the polymer electrolytes as a percentage of the weight of the composition.

Membrane Electrode Assembly Preparation

A further aspect of the present invention provides a membrane electrode assembly (MEA) comprising the guanidine base functionalized polymer membrane and dispersion according to the present invention and a method for preparing such a membrane electrode assembly.

A catalyst ink can be made from the polymer electrolyte dispersion and catalyst. The term "catalyst" will be well understood by a person skilled in the art by meaning a catalyst that when incorporated into the electrode, facilitates an electrochemical reaction. For example, the catalyst may be selected from platinum, palladium, rhodium, ruthenium, iridium, iron, cerium, titanium, vanadium, osmium, gold, silver, nickel, cobalt, manganese, or alternatively may be a base metal or base metal oxide, pyrolyzed (or unpyrolyzed) macrocyles, spinel, pyrochlores, perovskite-type oxides, or an alloy or mixture comprising one or more of these metals preferably supported on a conductive substrate, such as carbon. Various from of carbon such as particulate carbon, carbon nanotubes, nanotube/perovskite composites can be used as electrode materials.

The polymer electrolyte dispersion is typically prepared by dispersing the anion exchange membrane which can be processed to make electrodes, which in turn allow fabrication of durable membrane electrode assemblies (MEAs) by using fabrication methods described, e.g., in U.S. Pat. No. 5,998,057 (Koschany et al.) and U.S. Patent Application 2010/0183804 (Kim et al.). Other known method such as direct painting of catalyst ink onto a membrane, decal transfer, spray painting, screen printing, roll coating, hot pressing etc. as would be known to one of skill in the art also may be used. Using these fabrication methods, a highly stable and durable interface between the membrane and electrode can be obtained without using a cross-linking reaction.

EXAMPLES

The following describe some non-limiting examples which represent various embodiments of the present invention. In all examples, "equivalent weight," (EW) means molecular weight per cation, i.e., the reciprocal value of the anion exchange capacity of a polymer, and is understood to mean the weight of the polymer in cation form required to neutralize one equivalent of HCl. Examples 1 to 4 describe the synthesis of guanidine base functionalized perfluorinated anion exchange polymer electrolytes having stabilizing spacer.

Example 1

A perfluorinated polymer precursor (film thickness: 25 μm, carboxylic acid form, EW1100) was treated with tetrabutylammonium hydroxide (TBAOH) solution at room temperature for 24 hr. The perfluorinated polymer precursor (TBA$^+$ form) was treated with 4-fluoroaniline in dimethylformamide (DMF) solution at 130° C. for 24 hr. The result polymer was treated with 1,1,3,3-tetramethylguanidine in dimethylformamide (DMF) solution at 90° C. for 24 hr. After the polymer was dried under a vacuum oven at 75° C., the polymer was washed with NaOH (0.5M) solution and pure water at boiling temperature.

Tetramethlguanidine functionalized perfluorinated polymers were further treated with dimethyl sulfate (DMS) in DMF at 90° C. for 24 hr. Pentamethylguanidine functionalized perfluorinated polymer was obtained. Guanidine functionalized perfluorinated polymers was further treated with 1 M NaOH followed by washing with water.

Example 2

A perfluorinated polymer precursor (film thickness: 25 μm, carboxylic acid form, EW1100) was treated with tetrabutylammonium hydroxide (TBAOH) solution at room temperature for 24 hr. The perfluorinated polymer precursor (TBA$^+$ form) was treated with 4-fluoroaniline in dimethylformamide (DMF) solution at 130° C. for 24 hr. The result polymer was treated with 1,1,3,3-tetramethylguanidine in dimethylformamide (DMF) solution at 90° C. for 24 hr. After the polymer was dried under a vacuum oven at 75° C., the polymer was washed with NaOH (0.5M) solution and pure water at boiling temperature.

Tetramethylguanidine functionalized perfluorinated polymer was further treated with allyl bromide in DMF at 90° C. for 24 hr. Functionalized perfluorinated polymer was obtained. Guanidine functionalized perfluorinated polymers was further treated with 1 M NaOH followed by washing with water, Example 3

A perfluorinated polymer precursor (film thickness: 25 μm, carboxylic acid form, EW1100) was treated with tetrabutylammonium hydroxide (TBAOH) solution at room temperature for 24 hr. The perfluorinated polymer precursor (TBA$^+$ form) was treated with 4-chloro-1,2-phenylenediamine, triphenylphosphite, and LiCl in dimethylformamide (DMF) solution at 100° C. for 5 hr and 130° C. for 24 hr. The result polymer was treated with 1,1,3,3-tetramethylguanidine in dimethylformamide (DMF) solution at 90° C. for 24 hr. After the polymer was dried under a vacuum oven at 75° C., the polymer was washed with NaOH (0.5M) solution and pure water at boiling temperature.

Tetramethlguanidine functionalized perfluorinated polymers were further treated with dimethyl sulfate (DMS) in DMF at 90° C. for 24 hr. Pentamethylguanidine functionalized perfluorinated polymer was obtained. Guanidine functionalized perfluorinated polymers was further treated with 1 M NaOH followed by washing with water.

Example 4

A perfluorinated polymer precursor (film thickness: 25 μm, carboxylic acid form, EW1100) was treated with tetrabutylammonium hydroxide (TBAOH) solution at room temperature for 24 hr. The perfluorinated polymer precursor (TBA+ form) was treated with 4-chloro-1,2-phenylenediamine, triphenylphosphite, and LiCl in dimethylformamide (DMF) solution at 100° C. for 5 hr and 1.30° C. for 24 hr. The result polymer was treated with 1,1,3,3-tetramethylguanidine in dimethylformamide (DMF) solution at 90° C. for 24 hr. After the polymer was dried under a vacuum oven at 75° C., the polymer was washed with NaOH (0.5M) solution and pure water at boiling temperature.

Tetramethylguanidine functionalized perfluorinated polymer was further treated with allyl bromide in DMF at 90° C. for 24 hr. Functionalized perfluorinated polymer was obtained. Guanidine functionalized perfluorinated polymers from Example 6 was further treated with 1 M NaOH followed by washing with water.

Comparative Example 1

Synthesis of Guanidine Base Functionalized Perfluorinated Anion Exchange Polymer Electrolytes without Stabilizing Spacer A perfluorinated polymer precursor (film thickness: 25 μm, sulfonyl fluoride form, EW1100) was treated with 1,1,3,3-tetramethylguanidine in dimethylformamide (DMF) solution at 90° C. for 24 hr. After washing with water, the membrane was dried under a vacuum plate at 75° C. The absorption by C=N was observed at 1525-1580 cm$^{-1}$ by FT-IR, and C=N and N—CH$_3$ peak was observed at 162 and 39.5 ppm by C-NMR, respectively. Tetramethlguanidine functionalized perfluorinated polymers were further treated with dimethyl sulfate (DMS) in DMF at 90° C. for 24 hr. Pentamethylguanidine functionalized perfluorinated polymer was obtained. Guanidine functionalized perfluorinated polymers were further treated with 1 M NaOH for 4 hr at boiling temperature followed by washing with water.

Comparative Example 2

Synthesis of Other Base Functionalized Anion Exchange Membranes

Trimethylamine, triethylamine and 1,4-diazabicyclo-[2,2,2]-octane (DABCO) functionalized anion exchange polymer electrolytes were prepared. The C peak of —CH$_3$ and —CH$_2$N in triethylamine were observed at 9 and 45 ppm by $^{13}$C NMR, respectively. The C peak of CH$_2$N in DABCO was observed at 45 ppm by $^{13}$C NMR. However after soaking these membranes in 1 M NaOH for 10 hr, membrane degradation was observed.

Examples 5-11 describe the synthesis of guanidine base functionalized hydrocaron anion exchange polymer electrolytes.

Example 5

Fluorinated poly aromatic polymer was synthesized from decafluorobiphenyl and methyl hydroquinone. The synthesized polymer was brominated with N-bromosuccinimide and 2,2% azobisisobutyronitrile. Brominated polymer was treated with pentamethylguanidine in dimethylformamide (DMF) solution at 90° C. for 24 hr. The membrane was dried under a vacuum plate at 75° C. The absorption by CN$_3$ and CH$_3$ was observed at 1620 cm$^{-1}$ and 1400 by FT-IR respectively.

Guanidine functionalized hydrocarbon polymers were further treated with 1 M NaOH for 4 hr at boiling temperature followed by washing with water.

Example 6

Modified Polysulfone (PSU) was synthesized with 4-fluorobenzoyl chloride. PSU was dissolved in anhydrous THF. Butyllithium and 4-fluorobenzoly chloride were added into solution at −78° C. The modified PSU was reacted with TMG in DMF at 130° C. The membrane was dried under a vacuum plate at 75° C. Tetramethylguanidine functionalized PSU polymer was further treated with dimethyl sulfate (DMS) in DMF at 90° C. for 24 hr. The absorption by CN$_3$ and CH$_3$ was observed at 1620 cm$^{-1}$ and 1400 by FT-IR respectively. Guanidine functionalized hydrocarbon polymers were further treated with 1 M NaOH for 4 hr at boiling temperature followed by washing with water.

Example 7

Modified Polysulfone (PSU) was synthesized with 4-fluorobenzoyl chloride. PSU was dissolved in anhydrous THF. Butyllithium and 4-fluorobenzoly chloride were added into solution at −78° C. The modified PSU was reacted with TMG in DMF at 130° C. The membrane was dried under a vacuum plate at 75° C. Tetramethylguanidine functionalized PSU polymer was further treated with allyl bromide in DMF at 90° C. for 24 hr. The absorption by CN$_3$ and CH$_3$ was observed at 1620 cm$^{-1}$ and 1400 by FT-IR respectively. Guanidine functionalized hydrocarbon polymers were further treated with 1 M NaOH for 4 hr at boiling temperature followed by washing with water.

Example 8

The fluorinated sulfone polymer was synthesized from decafluorobiphenyl and 4,4-sulfonydiphenol in dimethyl sulfoxide (DMSO) at 90° C. Modified fluorinated sulfone polymer was synthesized with 4-fluorobenzoyl chloride. The fluorinated sulfone polymer was dissolved in anhydrous THF. Butyllithium and 4-fluorobenzoly chloride were added into solution at −78° C. The modified fluorinated sulfone polymer was reacted with TMG in DMF at 130° C.

Tetramethylguanidine functionalized fluorinated sulfone polymer was further treated with dimethyl sulfate (DMS) in DMF at. 90° C. for 24 hr. Guanidine functionalized hydrocarbon polymers were further treated with 1 M NaOH for 4 hr at boiling temperature followed by washing with water.

Example 9

The fluorinated sulfone polymer was synthesized from decafluorobiphenyl and 4,4-sulfonydiphenol in dimethyl sulfoxide (DMSO) at 90° C. Modified fluorinated sulfone polymer was synthesized with 4-fluorobenzoyl chloride. The fluorinated sulfone polymer was dissolved in anhydrous THF. Butyllithium and 4-fluorobenzoly chloride were added into solution at −78° C. The modified fluorinated sulfone polymer was reacted with TMG in DMF at 130° C.

Tetramethylguanidine functionalized fluorinated sulfone polymer was further treated with allyl bromide in DMF at 90° C. for 24 hr. Guanidine functionalized hydrocarbon polymers were further treated with 1 M NaOH for 4 hr at boiling temperature followed by washing with water.

Example 10

The poly(arylene ether sulfone) polymer containing activated fluorine group was synthesized from difluorodiphenylsulfone and 1,1-bis(4-hydroxyphenyl)-1-(4-((4-fluorophenyl)thio)phenyl-2,2,2-trifluoroethane) (3FBPT monomer synthesized from 4-fluoro-2,2,2-trifluoroacetophenone (F3FAP), 4-fluorothiophenol (FTP), and phenol). After typical oxidation procedure, the modified polymer sulfone polymer was reacted with TMG in DMAc at 130° C.

Tetramethylguanidine functionalized fluorinated sulfone polymer was further treated with dimethyl sulfate (DMS) in DMF at 90° C. for 24 hr. Guanidine functionalized hydrocarbon polymers were further treated with 1 M NaOH for 4 hr at boiling temperature followed by washing with water.

Example 11

The poly(arylene ether sulfone) polymer containing activated fluorine group was synthesized from difluorodiphenylsulfone and 1,1-bis(4-hydroxyphenyl)-1-(4-((4-fluorophenyl)thio)phenyl-2,2,2-trifluoroethane) (3FBPT monomer synthesized from 4-fluoro-2,2,2-trifluoroacetophenone (F3FAP), 4-fluorothiophenol (FTP), and phenol). After typical oxidation procedure, the modified polymer sulfone polymer was reacted with TMG in DMAc at 130° C.

Tetramethylguanidine functionalized fluorinated sulfone polymer from was further treated with allyl bromide in DMF at 90° C. for 24 hr. Guanidine functionalized hydrocarbon polymers were further treated with 1 M NaOH for 4 hr at boiling temperature followed by washing with water.

Table 1 shows the hydrolytic stability in 1 M NaOH of Examples 1-11 and Comparative Example 1 and 2.

TABLE 1

Hydrolytic stability of perfluorinated and hydrocarbon based anion exchange polymer electrolytes.

| Example | Polymer Backbone | Functional group | Stability test[a] | Conductivity (mS/cm) | Solubility[c] |
|---|---|---|---|---|---|
| Example 1 | Perfluorinated | Functionalized guanidine with stabilizing spacer | Stable | NA[b] | ○ |
| Example 2 | | | Stable | NA | ○ |
| Example 3 | | | Stable | NA | ○ |
| Example 4 | | | Stable | NA | ○ |
| Comparative Example 1 | | Functionalized guanidine without stabilizing spacer | $S_N2$ Hydrolysis | 37 | ○ |
| Comparative Example 2 | | Trimethyl amine Triethyl amine DABCO | $S_N2$ Hydrolysis $S_N2$ Hydrolysis $S_N2$ Hydrolysis | NA NA NA | X X X |
| Example 5-11 | Hydrocarbon | Functionalized guanidine with stabilizing spacer | Stable | 20 | ○ |

[a]Test condition: After soaking in 1 M NaOH for 10 h at room temperature,
[b]NA: not available,
[c]soluble in organic solvent (DMF, NMP, DMAc, DMSO) before methylation (○ = soluble in an organic solvent, e.g., as described herein; X = insoluble.)

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a polymeric core uniformly dispersed in a suitable solvent, said polymeric core having the structure:

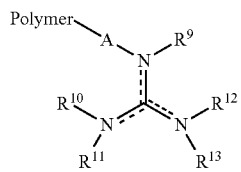

wherein:

i) A is a spacer having the structure O, S, SO$_2$, —NH—, —N(CH$_2$)$_n$, wherein n=1-10,

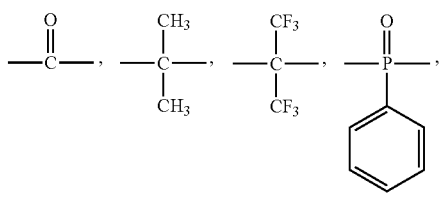

-continued

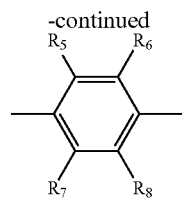

wherein R$_5$, R$_6$, R$_7$ and R$_8$ each are independently —H, —NH$_2$, F, Cl, Br, CN, or a C$_1$-C$_6$ alkyl group, or any combination of thereof;

ii) R$_9$, R$_{10}$, R$_{11}$, R$_{12}$, or R$_{13}$ each independently are —H, —CH$_3$, —NH$_2$, —NO, allyl, HC═O—, CH$_3$C═O—, NH$_2$C═O—, —(CH$_2$)$_n$—C(NH$_2$)—

COOH where n=1-6, —CH—(COOH)—CH$_2$—COOH, —CH$_2$—CH(O—CH$_2$CH$_3$)$_2$, —(C=S)—NH$_2$, —(C=NH)—N—(CH$_2$)$_n$CH$_3$, where n=0-6, —NH—(C=S)—SH, —CH$_2$—(C=O)—O—C(CH$_3$)$_3$, —O—(CH$_2$)$_n$—CH—(NH$_2$)—COOH, where n=1-6, —(CH$_2$)$_n$—CH=CH wherein n=1-6, —(CH$_2$)$_n$—CH=CN wherein n=1-6, an aromatic group, a halide, or halide-substituted methyl groups; and iii) wherein the composition is suitable for use in a membrane electrode assembly.

2. The composition of claim 1, wherein R$_9$, R$_{10}$, R$_{11}$, R$_{12}$, and R$_{13}$ are CH$_3$.

3. The composition of claim 1, wherein the solvent is an aprotic solvent.

4. The composition of claim 3, wherein the aprotic solvent is selected from the group consisting of dimethylformamide, dimethylacetamide, N-methylpyrrolidone, dimethylsulfoxide, and combinations thereof.

5. The composition of claim 1, wherein the solvent is an alcohol.

6. The composition of claim 5, wherein the alcohol is selected from the group consisting of ethanol, n-propanol, iso-propanol, n-butanol, sec-butanol, iso-butanol, tert-butanol, ethylene glycol, propylene glycol, 1,2-butanediol, 1,3-butanediol, 2,3-butanediol, 1,4-butanediol, 1,5 pentanediol, propane-1,2,3-triol, 1,2,4 butanetriol, and combinations thereof.

7. The composition of claim 1, wherein the composition further comprises a catalyst.

8. The composition of claim 1, wherein said aromatic group of R$_9$, R$_{10}$, R$_{11}$, R$_{12}$, or R$_{13}$ is each independently phenyl, benzyl, phenoxy, methylbenzyl, or nitrogen-substituted benzyl.

* * * * *